United States Patent
Choi

[11] Patent Number: 6,047,554
[45] Date of Patent: Apr. 11, 2000

[54] OPTIMUM DEFROSTING CYCLE CONTROL METHOD FOR INVERTER REFRIGERATOR

[75] Inventor: O Bong Choi, Changwon, Rep. of Korea

[73] Assignee: LG Electronics Inc., Seoul, Rep. of Korea

[21] Appl. No.: 09/417,697

[22] Filed: Oct. 13, 1999

[30] Foreign Application Priority Data

Nov. 20, 1998 [KR] Rep. of Korea ............ 98-49903

[51] Int. Cl.$^7$ ............................................. F25B 47/02
[52] U.S. Cl. ........................... 62/154; 62/80; 62/155
[58] Field of Search .................. 62/151, 154, 155, 62/156, 234, 80, 228.4

[56] References Cited

U.S. PATENT DOCUMENTS

| | | | |
|---|---|---|---|
| 4,302,947 | 12/1981 | Mueller et al. | 62/156 X |
| 4,417,452 | 11/1983 | Ruminsky et al. | 62/155 |
| 4,751,825 | 6/1988 | Voorhis et al. | 62/234 |
| 5,666,816 | 9/1997 | Jeong et al. | 62/154 |

*Primary Examiner*—Harry B. Tanner
*Attorney, Agent, or Firm*—Fleshner & Kim, LLP

[57] ABSTRACT

The present invention relates to an optimum defrosting cycle method of an inverter refrigerator. In the past, a defrosting cycle setting method for a conventional refrigerator with which a defrosting operation was carried out when the operation time of a compressor reaches a certain amount of time(e.g. 7 hours) by simply accumulating the operation time of the compressor. However, there have been drawbacks since the operation speed of a compressor varies for a high speed, mid speed, and low speed according to the surrounding condition when the conventional method is applied to the inverter refrigerator, it is not relevant to set the defrosting cycle by simply accumulating the operation time. For example, an over defrosting operation is performed and a power consumption is increased since the defrosting operation performed at an accumulative time in a state that a certain frosted amount is not obtained for an effective defrosting operation due to an increase operation factor in a case that a low speed operation of the compressor is continued. Accordingly, the present invention operates by a first step of checking the operation time of the compressor by operation frequencies in a defrosting mode, a second step of obtaining the frosting ratio per unit time of the compressor by operation frequencies, a third step of computing accumulated defrosting time using the operation time obtained in the first step and the frosting ratio obtained in the second step, and a fourth step of continuously accumulating the accumulated time computed in the third step if it does not reach a certain amount of time, or turning heaters "ON" for defrosting operation if it reaches a certain amount of time, thereby minimizing power consumption and improving the efficiency of the defrosting operation.

2 Claims, 4 Drawing Sheets

T = T1+T2+T3+T4+T5

$$T = T1 \times \frac{H1}{H1} + (T2+T3)\frac{H2}{H1} + (T4+T5)\frac{H3}{H1}$$

OPTIMUM DEFROSTING CYCLE CONTROL METHOD FOR INVERTER REFRIGERATOR

BACKGROUND OF THE INVENTION

1. Field of the Invention

The present invention relates to an optimum defrosting cycle control method for an inverter refrigerator for obtaining an optimum defrosting cycle by accumulatively computing frosting time based on a frosted amount by operation cycles in an operation speed-variable inverter refrigerator. In particular, the present invention relates to an optimum defrosting cycle control method for an inverter refrigerator which is capable of obtaining an optimum defrosting cycle by providing different accumulative ratios based on an high-speed operation, mid-speed operation, and low-speed operation according to a frequency of a compressor by operation cycles, for thereby decreasing a power consumption of a refrigerator.

2. Description of the Background Art

In a refrigerator, a freezing system operates by a freezing cycle in which heat is absorbed from the interior of the refrigerator, and the thusly absorbed heat is radiated to the outside of the refrigerator in order to retain a lower temperature in the refrigerator than the surrounding outside temperature.

Generally, to absorb the heat in the refrigerator, the heat must be absorbed in a lower temperature than that of the interior of the refrigerator, and the above-described function is performed by an evaporator(cooling unit). To maintain the temperature in a conventional refrigerator lower than −18° C., the temperature of the evaporator must be lower than −23° C. Therefore, the temperature of the evaporator is the lowest in the refrigerator, and the moisture in the refrigerator is mostly frosted on the evaporator. When a certain amount of moisture is frosted on the evaporator, the efficiency of the evaporator decreases, thus the frosted moisture should be removed periodically.

In addition, the amount of moisture frosted on the evaporator is different according to the temperature and blowing capacity of the evaporator. The higher the temperature of the evaporator and the smaller the blowing capacity, the less amount of frost. Therefore, in the inverter refrigerator of the present invention, a defrosting cycle is set, considering that the frosted amount varies according to the evaporating temperature by operation frequencies with the variation of the operation speed of a compressor.

FIG. 1 is a schematic view of a conventional refrigerator. As shown therein, the conventional refrigerator comprises a compressor 13 providing a high temperature and high pressure gaseous coolant, an evaporator 11 which cools a freezing compartment 20 and a refrigerating compartment 30 through heat exchange with an environment division by evaporating the coolant which is provided from the compressor 13, by changing the coolant into a low temperature and low pressure liquid while passing through a condenser (not shown) and a capillary tube(not shown), a damper 12 which controls the temperature of the refrigerating compartment by supplying cold air from the freezing compartment 20 to the refrigerating compartment or cutting off the same, and a freezing fan motor 10 which drives a freezing fan which forcedly blows cold air as a process of a cold air circulation.

FIG. 2 is a block diagram of a defrosting circuit in a conventional refrigerator. As shown therein, the defrosting circuit comprises a micro computer 21 which outputs various kinds of control signals by each unit in order to control the temperature of the freezing and refrigerating compartments, a compressor COMP which compresses coolant required for cooling the freezing and refrigerating compartments, a L-cord heater 22 and TE-plate heater 23 for melting frost formed on the evaporator, first through third relays RY1–RY3 which controls the operation of the evaporator 11, L-cord heater 22, and TE-plate heater 23 under the control of the micro computer 21, and a freezing sensor S1 for detecting the temperature of the freezing compartment.

FIG. 3 is a chart showing an operation cycle with respect to an operation time of the compressor for obtaining accumulated defrosting time in FIG. 1.

Referring to FIGS. 1 through 3, the thusly constituted conventional art will be explained in detail as follows.

First, when source voltage is applied, the micro computer 21 turns the first relay RY1 "ON" through an output terminal P1 thereof. As the first relay RY1 is turned "ON", the compressor COMP operates to compress gaseous coolant with high temperature and high pressure, and supplies the compressed coolant to the evaporator 11 in FIG. 1 via the condenser(not shown) and capillary tube(not shown). Then, the evaporator 11 absorbs heat in the freezing compartment 20 by evaporating the coolant and radiates the heat to the outside of the freezing compartment 20, thereby cooling the freezing compartment 20.

Since the transfer path of the coolant is the same as the cooling cycle of a conventional refrigerator, the description thereof will be omitted.

The freezing compartment 20 is then cooled by driving the freezing fan motor 10 to forcedly blow cold air for cold air circulation. When cooling is thusly implemented, the micro computer 21 reads the temperature of the freezing compartment from the freezing sensor S1 attached in the freezing compartment 20. When the thusly read temperature of the freezing compartment reaches a predetermined temperature, the micro computer 21 turns the first relay RY1 "OFF" to thereby deactivate the compressor COMP.

The temperature in the refrigerating compartment is controlled by the operation of supplying the cold air of the freezing compartment to the refrigerating compartment or cutting off the same by turning a damper 12 "ON" or "OFF" for controlling the cold air of the refrigerating compartment 30.

When the above-described operation is implemented, the micro computer 21 accumulatively computes the operation time of the compressor COMP When the thusly accumulated time reaches a certain amount of time(e.g. 7 hours approximately), the micro computer 21 drives the second and third relays RY2 and RY3 for defrosting operation. That is, as shown in FIG. 3, each operation time of the compressor T1, T2, T3, T4, and T5 is all computed accumulatively to thereby obtain the accumulated defrosting time T.

$$T=T1+T2+T3+T4+T5$$

When the thusly obtained time reaches 7 hours, the micro computer 21 turns the second and third relays RY2 and RY3 "ON" through output terminals P2 and P3 thereof. With the second and third relays RY2 and RY3 turned "ON", the L-cord heater 22 and TE-plate heater 23 are activated.

Then, the L-cord heater 22 and TE-plate heater 23 are operated to melt frost (or ice) formed on the evaporator 11. When the operation of melting the frost formed on the evaporator 11 is carried out, the micro computer 21 reads the temperature from a defrosting sensor S2. When the temperature read from the defrosting sensor S2 reaches a certain degree, the second and third relay RY2 and RY3 is turned "OFF" to stop the operation of the heaters.

By the above-described process, the operation of the refrigerator and the defrosting operation are repeated.

However, in the conventional art described above, a defrosting operation is automatically carried out when the accumulated time reaches a certain amount of time(e.g. 7 hours) by accumulatively computing the operation time of the compressor so that the operation speed of the compressor may be the same all the time, that is, a defrosted amount per unit time may be almost constant. Therefore, it is not relevant to implement an automated defrosting operation when the operation speed of the compressor is variable like an inverter refrigerator. For example, an over defrosting operation is performed and a power consumption is increased since the defrosting operation performed at an accumulative time in a state that a certain frosted amount is not obtained for an effective defrosting operation due to an increase operation factor in a case that a low speed operation of the compressor is continued. As a result, an excessive defrosting is done, thereby increasing a power consumption.

SUMMARY OF THE INVENTION

An object of the present invention is to solve the conventional problems by a method of providing an optimum defrosting cycle by selecting accumulated defrosting time based on the frosting ratio per unit time by operation frequencies, and to thereby reduce power consumption and provide an optimum defrosting method cycle control method for an inverter refrigerator for improving the efficiency of defrosting operation.

DETAILED DESCRIPTION OF THE PREFERRED EMBODIMENTS

The present invention for achieving the above-described object will be described as follows while referring to FIGS. 4 and 5.

Figure 4:
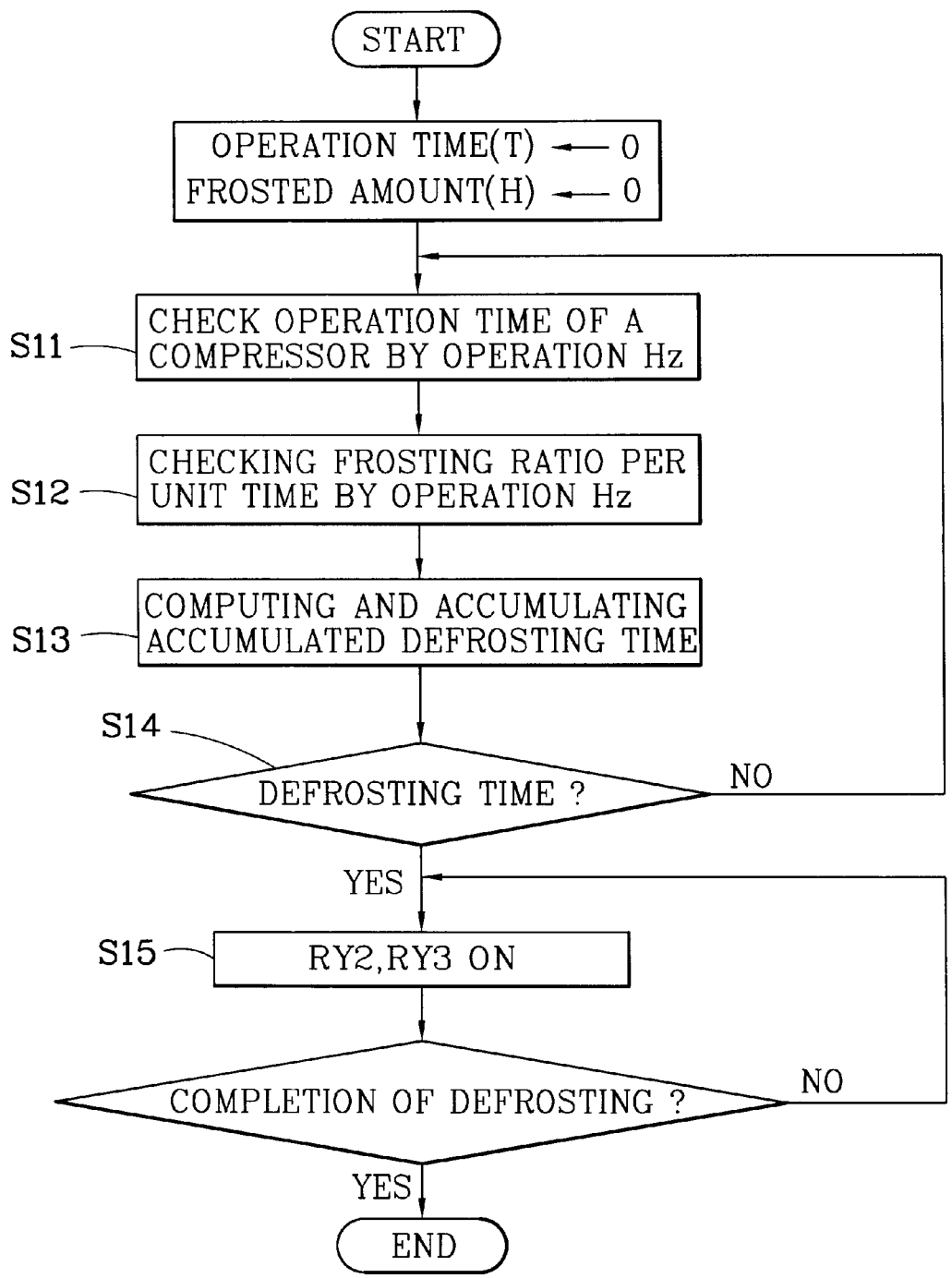
FIG. 4 is a flow chart of an optimum defrosting cycle control method for an inverter refrigerator of the present invention.

FIG. 4 is a flow chart of an optimum defrosting cycle control method for an inverter refrigerator of the present invention which comprises a step S11 for checking an operation time according to the operation frequency of a compressor in a defrosting mode; a step S12 for obtaining a frosting ratio per unit time by operation frequencies of a compressor; a step S13 for computing an accumulated defrosting time using the operation time obtained in step S11 and the frosting ratio per unit time obtained in step S12; and steps S14 and S15 for accumulating the accumulated defrosting time computed in step S13 if the accumulated defrosting time does not reach a certain amount of time and turning heaters "ON" for defrosting if the accumulated defrosting time reaches a certain amount of time.

In other words, the process of S12 and S13 are implemented by step S12 of reading a frosting ratio by operation frequencies from a pre-stored memory and step S13 of continuously accumulating the value obtained by multiplying the frosting ratio by the operation frequency taken in steps S11 and S12 to the previously computed value.

The frosting ratio mentioned above means the ratio of frosted amount per unit time by operation speeds with respect to a frosted amount per unit time during a conventional operation. That is, assuming that a reference frosted amount is $H_S$ and a frosted amount per unit time at a low speed is $H_L$, a frosting ratio at a low speed is $H_L/H_S$.

Figure 1:
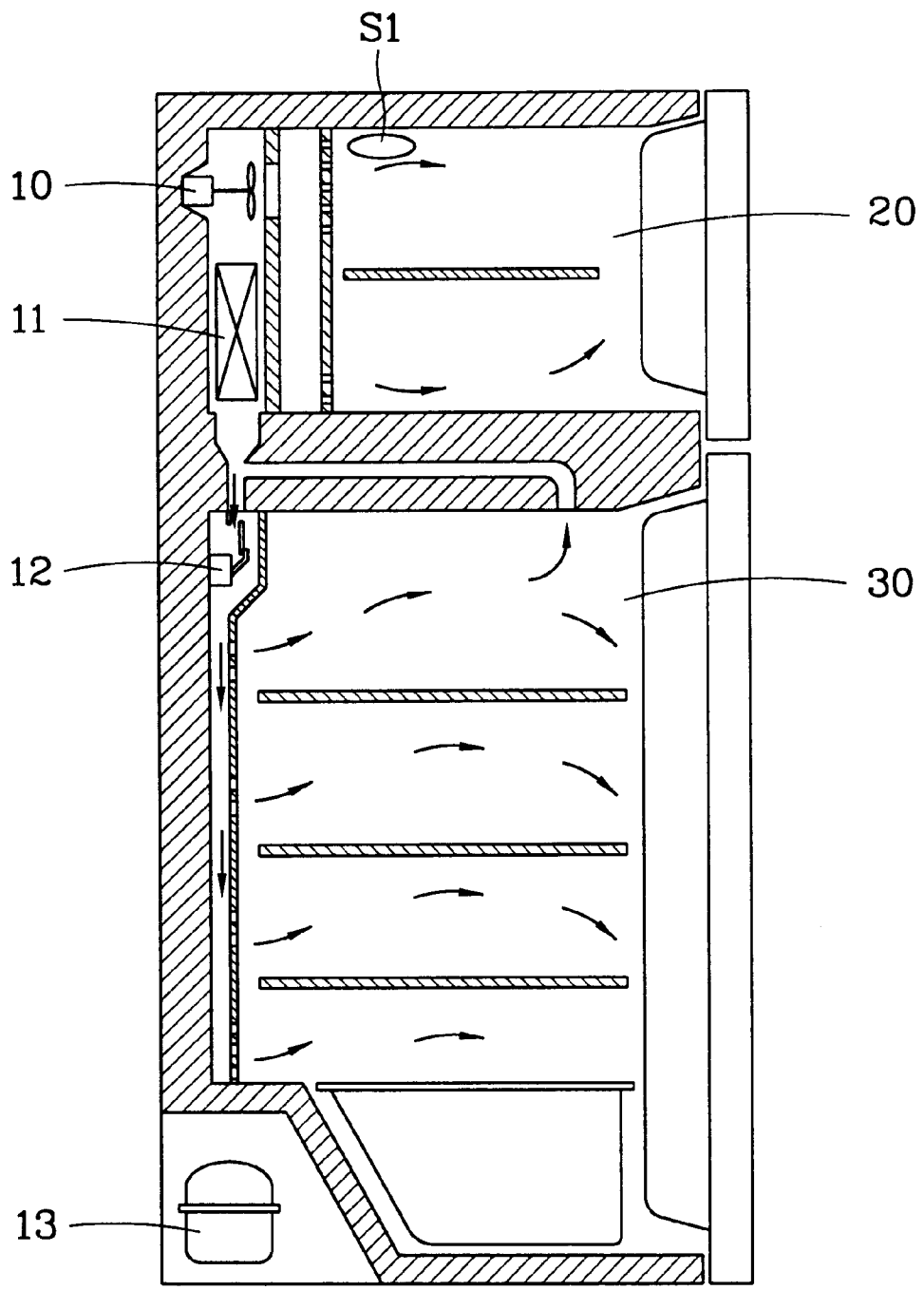
FIG. 1 is a schematic view of a conventional refrigerator.
Figure 2:
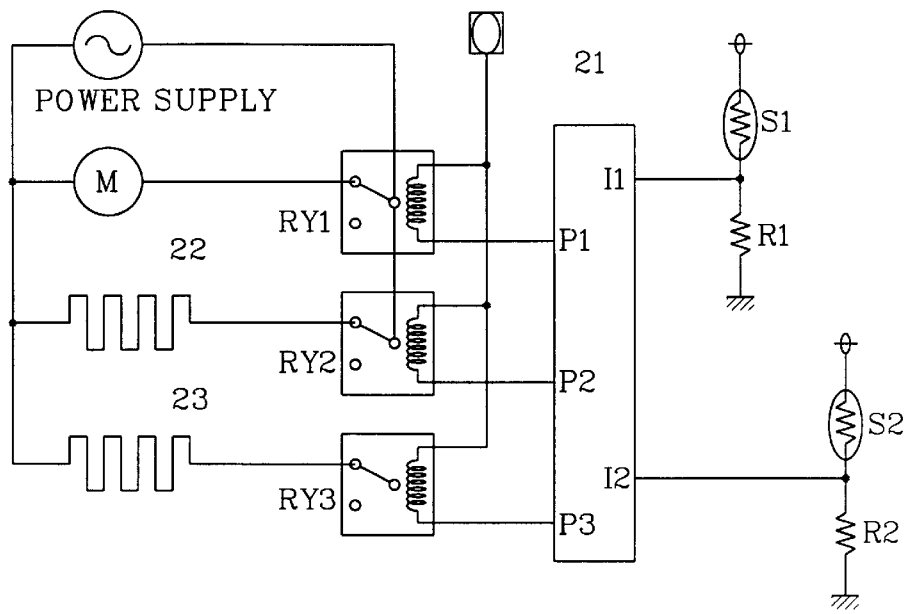
FIG. 2 is a block diagram of a defrosting circuit of a conventional refrigerator.
Figure 3:
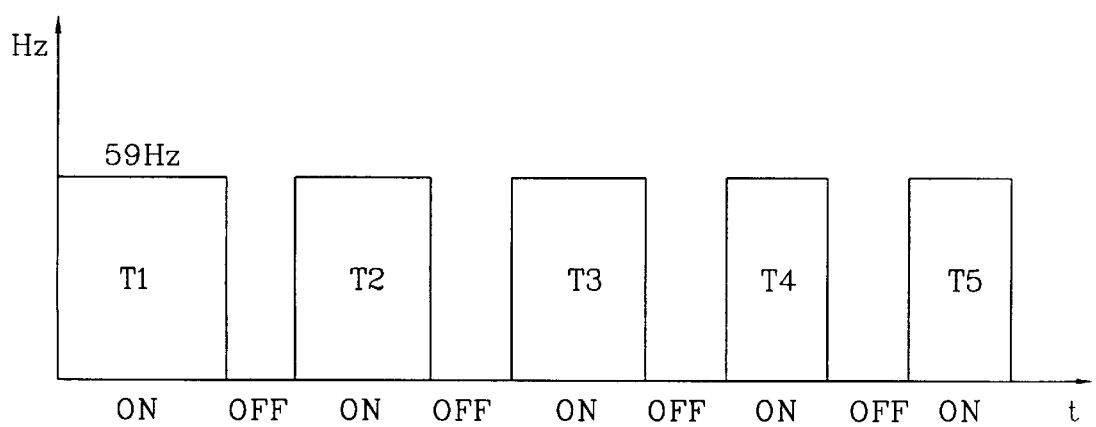
FIG. 3 is a chart of an operation cycle with respect to the operation time of a compressor for obtaining accumulated defrosting time for a conventional refrigerator.

First of all, the basic operation of the present invention comprising each of the steps stated above will be explained as follows referring to FIGS. 1 and 2.

Prior to a detailed description of the present invention, an inverter refrigerator will now be explained briefly. The inverter refrigerator is designed to vary the driving speed of the compressor according to ambient temperature. In the case the inside temperature of the refrigerator rises too high, the refrigerator is operated at a high speed to cool the interior of the refrigerator rapidly, and in the case the temperature rises too low because the door is rarely opened and closed, the refrigerator is operated at a low speed.

Since, for this inverter refrigerator, the mechanisms are already known, a detailed description is omitted.

When source voltage is supplied, a micro computer 21 turns a first relay RY1 "ON" through an output terminal P1 thereof. As the first relay RY1 is turned "ON", a compressor COMP operates to compress gaseous coolant into a high temperature and high pressure state, and supplies the compressed coolant to an evaporator 11 in FIG. 1 via a condenser (not shown) and a capillary tube(not shown). Then, the evaporator 11 cools a freezing compartment 20 by exchanging heat with the coolant, and a freezing fan motor 10 drives a freezing fan to forcedly blow cold air, thereby implementing cold air circulation. By this method, the freezing compartment is cooled. When the cooling operation is thusly carried out in the freezing compartment 20, the micro computer 21 reads the temperature of the freezing compartment from the freezing sensor S1 attached in the freezing compartment 20. When the thusly read temperature of the freezing compartment reaches a predetermined temperature, the micro computer 21 turns the first relay RY1 "OFF" to thereby inactivate the compressor COMP. Then, the coolant is not supplied to the evaporator 11, and thereby the evaporator is deactivated to stop the cooling operation. And, the temperature in the refrigerating compartment is controlled by the operation of supplying the cold air of the freezing compartment 20 to the refrigerating compartment 30 or cutting off the same by turning a damper 12 "ON" or "OFF" for controlling the cold air of the refrigerating compartment 30.

Again, referring to FIGS. 4 and 5, The process of the present invention will be explained in detail as follows.

As described above, when the temperature is controlled by controlling the cold air flow in the freezing 20 and refrigerating 30 compartments, the micro computer 21 checks the operation time of the compressor by operation frequencies with which the compressor COMP is operating in a defrosting mode for defrosting operation S11. Then, the frosting ratio per unit time by operation frequencies is obtained. S12.

When the operation time of the compressor by operation frequencies and the frosting ratio per unit time are obtained thusly, an accumulated defrosting time T is computed using these two values.

The above described process can be explained below by an example of implementing the refrigerator operation by a high-speed operation during T1, mid-speed operation during T2 and T3, and low-speed operation during T4 and T5. Also, here it is assumed that the reference frosted amount per unit time during a conventional operation is H1, the frosted amount during a high speed operation of 59 Hz.

Figure 5:
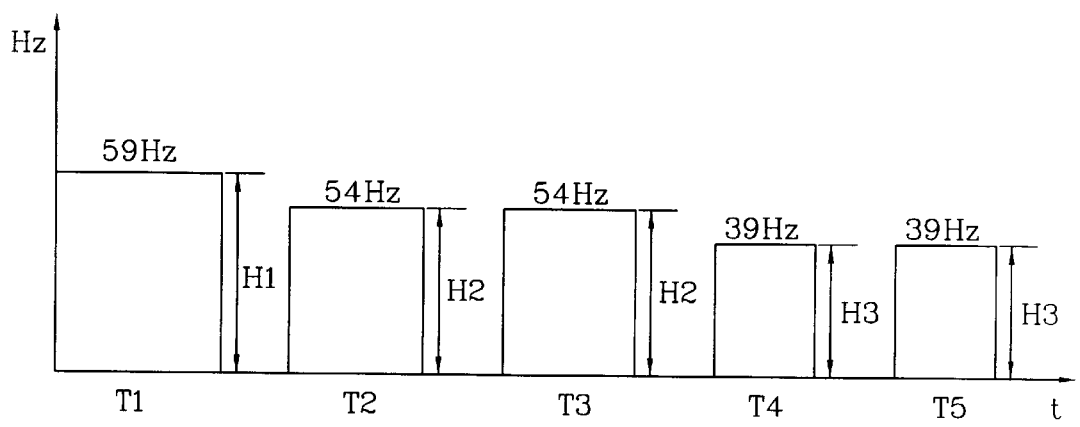
FIG. 5 is a chart of an operation cycle with respect to the operation time of a compressor.

As shown in FIG. 5, when the refrigerator is operated at a high speed of 59 Hz during T1, the frosting ratio per unit time thereof $$\frac{H1}{H1}$$

is obtained.

The accumulated defrosting time thereof $T_H$ can be obtained as below.

$$T_H = T_1 \times \frac{H1}{H1}$$

It is checked whether the thusly obtained accumulated defrosting time reaches a certain amount of time for defrosting(hereafter defrosting time) or not. S14.

As a result, if the accumulated defrosting time does not reach the defrosting time, the accumulated defrosting time when the compressor operates with the frosting ratio of $$\frac{H2}{H1}$$

per unit time during T2 and T3 at a mid speed of 54 Hz $T_M$ is obtained, $$T_M = (T2 + T3) \times \frac{H2}{H1}$$

The accumulated defrosting time during the high speed and mid speed operation of the compressor is added up, $$T_H + T_M = T1 \times \frac{H1}{H1} + (T2 + T3) \times \frac{H2}{H1}$$

and the thusly added time is compared again with the defrosting time to determine whether the added time is defrosted or not.

As a result, if the added time does not reach the defrosting time, the accumulated defrosting time when the compressor operates with the frosting ratio of $$\frac{H3}{H1}$$

per unit time during T4 and T5 at a low speed of 39 Hz $T_L$ is obtained.

Then, the accumulated defrosting time during T4 and T5 $T_L$ can be obtained as below.

$$T_L = (T4 + T5) \times \frac{H3}{H1}$$

Then, the accumulated defrosting time during a high speed, mid speed, and low speed operation $T = T_H + T_M + T_L$ are added.

$$T = T_H + T_M + T_L$$
$$= T1 \times \frac{H1}{H1} + (T2 + T3) \times \frac{H2}{H1} + (T4 + T5) \times \frac{H3}{H1}$$

Here, H1, H2, and H3 mean the frosted amount per unit time by operation speeds, and T1 through T5 represent the operation time of the compressor.

The thusly added time T is compared with the defrosting time to determine whether the added time reaches the defrosting time. S14.

As a result, when the added accumulated defrosting time T reaches a certain amount of time for defrosting, the micro computer 21 turns the second relay RY2 and third relay RY3 "ON" through output terminals P2 and P3 thereof. As the second relay RY2 and third relay RY3 are turned "ON", the L-cord heater and TE-plate heater 23 are activated. Then, the L-cord heater 22 and TE plate heater 23 operate to melt frost (or ice) formed on the evaporator 11.

When the operation of melting the frost formed on the evaporator 11 is thusly carried out, the micro computer 21 read the temperature from the defrosting sensor S2. The temperature read from the defrosting sensor S2 reaches a certain degree, the second RY2 and third RY3 relays are turned "OFF" to stop the operation of the heaters.

In the above described step, the frosting ratio according to the operation frequency can be obtained by the method of reading the ratio pre-stored in the internal memory of the micro computer.

Accordingly, the present invention has effects of obtaining accumulated defrosting time by obtaining a frosting ratio per unit time by operation frequencies, reducing power consumption by implementing a defrosting operation using the thusly obtained accumulative defrosting time, and reconsidering the efficiency of the defrosting operation.

What is claimed is:

1. An optimum defrosting cycle control method for an inverter refrigerator comprising the following steps:
    a first step of checking an operation time of a compressor by operation frequencies in a defrosting mode;
    a second step of reading a frosting ratio per unit time of the compressor by operation frequencies from a micro computer;
    a third step of computing an accumulated defrosting time using the operation time obtained in the first step and the frosting ratio per unit time obtained in the second step; and
    a fourth step of accumulating the accumulated defrosting time computed in the third step, and then, continuously accumulating it if it does not reach a certain amount of time or turning heaters "ON" for a defrosting operation if it reaches a certain amount of time.

2. The method of claim 1, wherein the accumulated defrosting time in the third step is obtained by multiplying an operation speed by the frosting ratio.

* * * * *